United States Patent
Chae et al.

(10) Patent No.: US 11,211,595 B2
(45) Date of Patent: Dec. 28, 2021

(54) METHOD FOR MANUFACTURING NEGATIVE ELECTRODE

(71) Applicant: LG CHEM, LTD., Seoul (KR)

(72) Inventors: Oh Byong Chae, Daejeon (KR); Sang Wook Woo, Daejeon (KR); Je Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/966,269

(22) PCT Filed: Mar. 6, 2019

(86) PCT No.: PCT/KR2019/002624
§ 371 (c)(1),
(2) Date: Jul. 30, 2020

(87) PCT Pub. No.: WO2019/172661
PCT Pub. Date: Sep. 12, 2019

(65) Prior Publication Data
US 2020/0373553 A1    Nov. 26, 2020

(30) Foreign Application Priority Data
Mar. 7, 2018 (KR) .................. 10-2018-0026991

(51) Int. Cl.
*H01M 4/04* (2006.01)
*H01M 4/1391* (2010.01)
(Continued)

(52) U.S. Cl.
CPC ....... *H01M 4/0416* (2013.01); *H01M 4/1391* (2013.01); *H01M 4/1393* (2013.01);
(Continued)

(58) Field of Classification Search
USPC .......................................... 427/58, 115, 436
See application file for complete search history.

(56) References Cited

U.S. PATENT DOCUMENTS 5,543,021 A * 8/1996 Yazami ................ H01M 4/587
                                                                                                 204/294
5,595,837 A * 1/1997 Olsen .................. H01M 10/0525
                                                                                                 429/224
(Continued)

FOREIGN PATENT DOCUMENTS

JP    10-294104 A    11/1998
JP    2005-85632 A    3/2005
(Continued)

OTHER PUBLICATIONS

International Search Report issued in PCT/KR2019/002624 (PCT/ISA/210), dated Jun. 17, 2019.
(Continued)

*Primary Examiner* — Brian K Talbot
(74) *Attorney, Agent, or Firm* — Birch, Stewart, Kolasch & Birch, LLP

(57) ABSTRACT

A method for manufacturing a negative electrode, the method including immersing a preliminary negative electrode in a pre-lithiation solution, the pre-lithiation solution including a lithium organic compound and a pre-lithiation solvent, taking the preliminary negative electrode out of the pre-lithiation solution and then removing pre-lithiation solvent present in the preliminary negative electrode, wherein the preliminary negative electrode includes a current collector and a preliminary negative electrode active material layer on the current collector, the preliminary negative electrode active material layer includes a negative electrode active material, and a standard reduction potential of the lithium organic compound is lower than a standard reduction potential of the negative electrode active material.

5 Claims, 1 Drawing Sheet

(51) Int. Cl.
*H01M 4/1393* (2010.01)
*H01M 4/48* (2010.01)
*H01M 4/587* (2010.01)
*H01M 10/0525* (2010.01)
*H01M 4/02* (2006.01)

(52) U.S. Cl.
CPC ........... *H01M 4/483* (2013.01); *H01M 4/587* (2013.01); *H01M 10/0525* (2013.01); *H01M 2004/027* (2013.01)

(56) References Cited

U.S. PATENT DOCUMENTS

| | | | | |
|---|---|---|---|---|
| 5,743,921 | A * | 4/1998 | Nazri | H01M 10/0525 29/623.5 |
| 6,159,636 | A | 12/2000 | Wang et al. | |
| 9,466,830 | B1 | 10/2016 | Shan et al. | |
| 10,218,033 | B1 * | 2/2019 | Bhardwaj | H01M 4/525 |
| 10,593,988 | B2 * | 3/2020 | Xiao | H01M 4/139 |
| 2003/0135989 | A1 * | 7/2003 | Huggins | H01M 4/049 29/623.1 |
| 2005/0079421 | A1 | 4/2005 | Konishiike et al. | |
| 2005/0130043 | A1 * | 6/2005 | Gao | H01M 4/043 429/231.95 |
| 2013/0003261 | A1 | 1/2013 | Remizov et al. | |
| 2014/0170476 | A1 | 6/2014 | Tan et al. | |
| 2014/0272567 | A1 * | 9/2014 | Zhang | H01M 4/139 429/212 |
| 2015/0364795 | A1 | 12/2015 | Stefan et al. | |
| 2016/0133941 | A1 | 5/2016 | Konishiike et al. | |
| 2016/0141596 | A1 * | 5/2016 | Uhm | H01M 4/587 429/220 |
| 2016/0172706 | A1 * | 6/2016 | Xiao | H01M 4/1395 429/189 |
| 2016/0284479 | A1 | 9/2016 | Okuno et al. | |
| 2017/0338480 | A1 | 11/2017 | Kim et al. | |
| 2019/0036118 | A1 * | 1/2019 | Ofer | H01M 4/1391 |

FOREIGN PATENT DOCUMENTS

| | | |
|---|---|---|
| JP | 2014-143380 A | 8/2014 |
| JP | 2016-506628 A | 3/2016 |
| KR | 10-2013-0007320 A | 1/2013 |
| KR | 10-2015-0014877 A | 2/2015 |
| KR | 10-2016-0017592 A | 2/2016 |
| KR | 10-2016-0094652 A | 8/2016 |
| KR | 10-2017-0020850 A | 2/2017 |
| WO | WO 2015/076059 A1 | 5/2015 |

OTHER PUBLICATIONS

Scott et al., "Chemical Formation of a Solid Electrolyte Interface on the Carbon Electrode of a Li-Ion Cell", J. Electrocem. Soc., vol. 145, No. 5, May 1998, pp. 1506-1510.

European Search Report dated Jan. 25, 2021 in corresponding EP Application No. 19763197.1.

Holtstiege et al., "Pre-Lithiation Strategies for Rechargeable Energy Storage Technologies: Concepts, Promises and Challenges", Batteries, vol. 4, No. 1, Jan. 23, 2018, XP055496069, DOI:10.3390/batteries4010004.

* cited by examiner

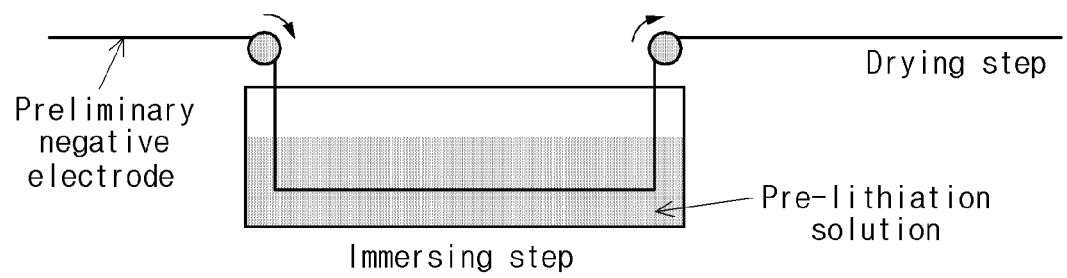

METHOD FOR MANUFACTURING NEGATIVE ELECTRODE

CROSS-REFERENCE TO RELATED APPLICATIONS

This application claims the benefit of Korean Patent Application No. 10-2018-0026991, filed on Mar. 7, 2018, in the Korean Intellectual Property Office, the disclosure of which is incorporated herein in its entirety by reference.

TECHNICAL FIELD

The present invention relates to a method for manufacturing a negative electrode, the method including immersing a preliminary negative electrode in a pre-lithiation solution, the pre-lithiation solution including a lithium organic compound and a pre-lithiation solvent, and taking the preliminary negative electrode out of the pre-lithiation solution and then removing pre-lithiation solvent present in the preliminary negative electrode, wherein the preliminary negative electrode includes a current collector and a preliminary negative electrode active material layer on the current collector, the preliminary negative electrode active material layer includes a negative electrode active material, and a standard reduction potential of the lithium organic compound is lower than a standard reduction potential of the negative electrode active material.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having high energy density, that is lithium secondary batteries having high capacity, have been subjected to considerable research and also have been commercialized and widely used.

In general, a secondary battery is composed of a positive electrode, a negative electrode, an electrolyte, and a separator. Among the above, the negative electrode includes a current collector and a negative electrode active material, and may include a negative electrode active material layer disposed on the current collector. In order to increase the energy density of the negative electrode, various negative electrode active materials such as silicon is used. However, there is a problem in that the capacity of a battery is reduced due to a high irreversible capacity and the lifespan properties of the battery are deteriorated.

In order to solve the above problem, a pre-lithiation method, in which an irreversible site in a negative electrode is first filled with lithium, has been introduced. As an example, there is a method in which lithium is doped when preparing a negative electrode active material. However, since a high temperature is required for doping lithium, it may be difficult to control the doping of lithium, and there may be problems regarding processability and cost.

Accordingly, there is a demand for a method for manufacturing a negative electrode, the method capable of solving a problem of irreversible capacity of the negative electrode and improving processability.

DISCLOSURE OF THE INVENTION

Technical Problem

An aspect of the present invention provides a method for manufacturing a negative electrode, the method capable of solving a problem of irreversible capacity of the negative electrode and improving processability.

Technical Solution

According to an aspect of the present invention, there is provided a method for manufacturing a negative electrode, the method including immersing a preliminary negative electrode in a pre-lithiation solution, the pre-lithiation solution including a lithium organic compound and a pre-lithiation solvent, and taking the preliminary negative electrode out of the pre-lithiation solution and then removing pre-lithiation solvent present in the preliminary negative electrode, wherein the preliminary negative electrode includes a current collector and a preliminary negative electrode active material layer on the current collector, the preliminary negative electrode active material layer includes a negative electrode active material, and a standard reduction potential of the lithium organic compound is lower than a standard reduction potential of the negative electrode active material.

Advantageous Effects

According to the present invention, it is possible to pre-lithiate a negative electrode without a process of applying a current. Accordingly, processability may be improved when manufacturing a battery, and the initial efficiency of the battery may be improved due to the pre-lithiation. When a lithium organic compound in an appropriate amount is applied, the capacity and lifespan properties of the battery may also be improved.

BRIEF DESCRIPTION OF THE DRAWING

FIG. 1 is a schematic diagram showing a method for manufacturing a negative electrode according to the method of an embodiment of the present invention.

BEST MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A method for manufacturing a negative electrode according to an embodiment of the present invention includes immersing a preliminary negative electrode in a pre-lithiation solution, the pre-lithiation solution including a lithium organic compound and a pre-lithiation solvent, and taking the preliminary negative electrode out of the pre-lithiation solution and then removing pre-lithiation solvent present in the preliminary negative electrode, wherein the preliminary negative electrode includes a current collector and a preliminary negative electrode active material layer on the current collector, the preliminary negative electrode active material layer includes a negative electrode active material, and a standard reduction potential of the lithium organic compound is lower than a standard reduction potential of the negative electrode active material.

The present invention is characterized in that a pre-lithiation process is performed on a negative electrode before assembling the negative electrode with a positive electrode. When following a manufacturing process in which a negative electrode and a positive electrode are assembled (a battery is manufactured) and then the assembled negative electrode and positive electrode is put into a pre-lithiation solution and applied with a current, the manufactured battery shroud be open to remove the pre-lithiation solution and introduce an electrolyte, so that processibility is deteriorated. In addition, when the current is applied, a polymer film SEI may be formed to be excessively thick on a negative electrode active material layer, so that the resistance of the manufactured negative electrode may be greatly increased. Furthermore, not only the negative electrode but also the positive electrode is reduced, so that the battery performance is deteriorated.

Meanwhile, the present invention is distinctively different from a method in which a negative electrode active material itself is pre-lithiated through a pre-lithiation solution. Specifically, when a negative electrode active material is pre-lithiated and then disposed on a current collector to manufacture a negative electrode, the electrical contact between negative electrode active materials is broken by a polymer film formed on each surface of the negative electrode active materials, thereby greatly increasing the resistance of the negative electrode. On the other hand, in the case of the present invention in which a preliminary negative electrode including a negative electrode active material is manufactured and then subjected to pre-lithiation through a pre-lithiation solution, the formation of a polymer film may be suppressed in a portion in which negative electrode active materials are either directly or indirectly connected to each other. Accordingly, an excessive increase in the resistance of a negative electrode may be prevented.

The preliminary negative electrode may include a current collector and a preliminary negative electrode active material layer on the current collector.

The current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the current collector may typically have a thickness of 3 μm to 500 μm, and microscopic irregularities may be formed on the surface of the current collector to improve the adhesion of the active material. For example, the current collector may be used in various forms such as a film, a sheet, a foil, a net, a porous body, a foam, and a non-woven body.

The preliminary negative electrode active material layer may be disposed on the current collector. Specifically, the preliminary negative electrode active material layer may be disposed on one surface or both surfaces of the current collector.

The preliminary negative electrode active material layer may include a negative electrode active material.

As the preliminary negative electrode active material, a compound capable of reversible intercalation and de-intercalation of lithium may be used. Specific examples thereof may include a carbon-based material such as hard carbon, soft carbon, artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, and an Al alloy; a metal oxide which may be doped and undoped with lithium such as $SiO_x(0<x<2)$, $SiO_2$, $SnO_2$, a vanadium oxide, and a lithium vanadium oxide; or a composite including the metallic compound and a carbonaceous material such as an Si—C composite, or an Sn—C composite, and any one thereof or a mixture of two or more thereof may be used. Specifically, the negative electrode active material may be at least one selected from the group consisting of a carbonaceous material, $SiO_x(0\leq x\leq 2)$, $SnO_2$, an Si—C composite, and an Sn—C composite. Furthermore, low crystalline carbon, high crystalline carbon and the like may all be used as a carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch-derived cokes.

More specifically, the negative electrode active material may include at least one of $SiO_x(0\leq x<2)$ and a carbon-based material. Particularly, $SiO_x(0\leq x<2)$ has an advantage of improving the capacity of a negative electrode, but the $SiO_x(0\leq x<2)$ has a disadvantage of having a large irreversible capacity, thereby having a low initial efficiency. In this respect, when following the method for manufacturing a negative electrode according to the present invention, the problem of irreversible capacity of a negative electrode may be solved, so that initial efficiency may be maintained even when the $SiO_x(0\leq x<2)$ is included in a negative electrode active material, and the capacity of the negative electrode may be improved.

The preliminary negative electrode active material layer may further include a binder. The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, poly acrylic acid, a material having the hydrogen thereof substituted with Li, Na, or Ca, and the like. In addition, the binder may include various copolymers thereof.

Furthermore, the negative electrode active material layer may further include a conductive material. The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as aluminum powder and nickel powder; a fluorocarbon powder; a conductive whisker such as zinc oxide and potassium titanate; a conductive metal oxide such as titanium oxide; a conductive agent such as a polyphenylene derivative, and the like may be used.

The pre-lithiation solution may include the lithium organic compound and the pre-lithiation solvent.

The lithium organic compound may serve to provide a lithium source such that the preliminary negative electrode active material layer includes metal lithium; lithium ions; a lithium compound such as a lithium alloy, a lithium silicate, and a lithium oxide. Accordingly, the problem of irreversible capacity of the negative electrode is solved, so that the initial efficiency of the battery may be improved.

A standard reduction potential of the lithium organic compound may be lower than a standard reduction potential of the negative electrode active material.

When the standard reduction potential of the lithium organic compound is higher than the standard reduction potential of the negative electrode active material, there is no sufficient electromotive force for lithium ions and electrons to move from the lithium organic compound the preliminary negative electrode active material layer. Accordingly, it is difficult to provide the lithium source to the preliminary negative electrode active material layer. When the standard reduction potential of the lithium organic compound is higher than the standard reduction potential of the negative electrode active material, a current of a predetermined amount or more should be supplied to either a preliminary negative electrode active material or to the lithium organic compound such that the lithium source is provided from the lithium organic compound. Accordingly, electrons are abundantly present in the preliminary negative electrode, thereby improving reducing power, so that the lithium source may be provided from the lithium organic compound. However, such a method requires a separate process for providing a current, thereby deteriorating processibility.

On the other hand, the method for manufacturing a negative electrode of the present embodiment does not include a step for applying a current to a preliminary negative electrode. Since the standard reduction potential of the lithium organic compound used in the present invention is lower than the standard reduction potential of the negative electrode active material, electrons and lithium ions may be provided from the lithium organic compound to the preliminary negative electrode active material layer due to reducing force without a separate current application process. Accordingly, metal lithium, lithium ions, and a lithium compound such as a lithium alloy, a lithium silicate, and a lithium oxide may be easily disposed in an irreversible site of the preliminary negative electrode active material layer.

The standard reduction potential of the negative electrode active material may be measured based on the Normal Hydrogen Electrode (NHE). Alternatively, the standard reduction potential of the negative electrode active material may be derived by calculating the standard reduction potential of a lithium electrode and the potential of the negative electrode active material to the lithium electrode.

Specifically, the lithium organic compound may include at least one selected from the group consisting of n-butyllithium, lithium triethylborohydride, lithium aluminum hydride, lithium tetrahydridoaluminate, methyllithium, sec-butyllithium, iso-propyllithium, tert-butyllithium, and phenyllithium. More specifically, the lithium organic compound may be n-butyllithium and/or methyllithium.

The lithium organic compound may be included in the pre-lithiation solution at a concentration of 0.01 M to 5.00 M, specifically 0.05 M to 1.00 M. When the above range is satisfied, suitable reducing power is generated, so that the lithium compound may be more easily disposed in the irreversible site of a negative electrode. Accordingly, the initial efficiency of the battery may be improved. More specifically, the lithium organic compound may be included in the pre-lithiation solution at a concentration of 0.09 M to 1.00 M. When the above range is satisfied, suitable reducing power is generated and since the amount of lithium source is sufficient, the problem of irreversible capacity of the negative electrode may be further solved. In addition, the pre-lithiation is prevented from excessively rapidly proceeding, thereby preventing an electrode from being damaged, so that the deterioration in the lifespan properties of the battery may be suppressed.

The pre-lithiation solvent may serve to dissolve the lithium organic compound in the state in which reducing power is maintained.

The pre-lithiation solvent may include at least one selected from the group consisting of hexane, diethyl ether, xylene, toluene, tetrahydrofuran, and dioxolane, and specifically, at least one among hexane, diethyl ether, and xylene.

Through the step of immersing the preliminary negative electrode in a preliminary negative electrode solution containing a lithium organic compound and a preliminary negative electrode solvent, the preliminary negative electrode is provided with a lithium source to form metal lithium, lithium ions, and a lithium compound such as a lithium alloy, a lithium silicate, and a lithium oxide on the preliminary negative electrode active material layer, so that a negative electrode active material layer which has been subjected to pre-lithiation may be formed.

The immersing may be performed for about 5 hours to 48 hours, specifically 10 hours to 30 hours. When the above range is satisfied, the negative electrode may be sufficiently reduced.

The immersing may include moving the preliminary negative electrode into the pre-lithiation solution and then immersing the same in the preliminary negative electrode solution. For example, referring to FIG. 1, the preliminary negative electrode is moved by a roll, and in some sections of the moving path, the preliminary negative electrode is introduced into the preliminary negative electrode solution received in a container. Thereafter, the preliminary negative electrode which has been left in the pre-lithiation solution for a predetermined duration of time is moved again and moved out of the pre-lithiation solution.

The removing of the pre-lithiation solvent may include washing and drying the preliminary negative electrode taken out of the pre-lithiation solution. Specifically, referring to FIG. 1, the preliminary negative electrode which has been left in the pre-lithiation solution for a predetermined duration of time is moved again and taken out of the pre-lithiation solution, and thereafter, may be washed with a washing solution such as hexane. Through the washing, the lithium organic compound remaining in the preliminary negative electrode may be removed. After the washing, the preliminary negative electrode may be dried. During the drying process, the pre-lithiation solvent present on the surface of and inside the preliminary negative electrode may be removed. Furthermore, the lithium organic compound may also be removed. As a result, the pre-lithiation process is completed, and the preliminary negative electrode may become a negative electrode which has been subjected to pre-lithiation.

A secondary battery according another embodiment of the present invention may include a negative electrode, a positive electrode, a separator interposed between the positive electrode and the negative electrode, and an electrolyte. The negative electrode is the same as the negative electrode described above, that is, the negative electrode which has been subjected to pre-lithiation. In other words, the negative electrode included in the secondary battery corresponds to a negative electrode manufactured according to the method for manufacturing a negative electrode of the embodiment described above. Therefore, since the negative electrode has already been described above, a detailed description thereof will be omitted.

The positive electrode may include a positive electrode current collector and a positive electrode active material layer formed on the positive electrode current collector and including the positive electrode.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 µm to 500 µm, and microscopic irregularities may be prepared on the surface of the positive electrode current collector to improve the adhesion of the positive electrode active material. For example, the positive electrode current collector may be used in various forms such as a film, a sheet, a foil, a net, a porous body, a foam, a non-woven body, and the like.

The positive electrode active material may be a positive electrode active material commonly used in the art. Specifically, the positive electrode active material may be a layered compound such as lithium cobalt oxide ($LiCoO_2$) and lithium nickel oxide ($LiNiO_2$), or a compound substituted with one or more transition metals; a lithium iron oxide such as $LiFe_3O_4$; a lithium manganese oxide such as a formula $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and $0.01 \leq c2 \leq 0.3$); a lithium manganese composite oxide represented by the formula $LiMn_{2-c3}M_{c3}O_2$ (wherein, M is any one of Co, Ni, Fe, Cr, Zn, or Ta, and $0.01 \leq c3 \leq 0.1$), or by the formula $Li_2Mn_3MO_8$ (wherein M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whiskey such as zinc oxide and potassium titanate; a conductive metal oxide such as titanium oxide; or a conductive polymer such as a polyphenylene derivative, and the like, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, cyclic carbonates(ethylene carbonate and propylene carbonate) may be preferably used since they are organic solvents of a high viscosity having high permittivity to dissociate a lithium salt well. Furthermore, such a cyclic carbonate may be more preferably used since the cyclic carbonate may be mixed with a linear carbonate of a low viscosity and low permittivity such as dimethyl carbonate and diethyl carbonate in an appropriate ratio to prepare an electrolyte having a high electric conductivity.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5P^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Manufacturing Example 1: Manufacturing of Preliminary Negative Electrode

A negative electrode active material (standard reduction potential: about −2.0 V vs. NHE) in which artificial graphite and SiO are mixed in a weight ratio of 7:3, denka black which is a conductive material, styrene butadiene rubber (SBR) and carboxymethylcellulose (CMC) which are binders were added to water in a weight ratio of 92:3:3.5:1.5 to prepare negative electrode slurry. The negative electrode slurry was applied to a copper (Cu) metal thin film having a thickness of about 20 μm, which is a negative electrode current collector, such that a loading amount reaches 5 mg/cm², dried for 12 hours in a vacuum oven at 130° C., and then roll pressed to manufacture a preliminary negative electrode.

Example 1: Manufacturing of Negative Electrode (1) Preparation of Pre-Lithiation Solution Hexane in which n-butyllithium (standard reduction potential: about −2.7 V vs. NHE) is dissolved at a concentration of 0.1 M was prepared as a pre-lithiation solution.

(2) Manufacturing of Negative Electrode (Pre-Lithiation)

The preliminary negative electrode of Manufacturing Example 1 was moved into the pre-lithiation solution, and then immersed in the pre-lithiation solution for 24 hours. Thereafter, the preliminary negative electrode was moved out of the pre-lithiation solution, washed with hexane, and then vacuum dried for an hour at 50° C. As a result, a negative electrode was manufactured.

Example 2: Manufacturing of Negative Electrode (1) Preparation of Pre-Lithiation Solution Hexane in which n-butyllithium (standard reduction potential: about −2.7 V vs. NHE) is dissolved at a concentration of 0.05 M was prepared as a pre-lithiation solution.

(2) Manufacturing of Negative Electrode

A negative electrode was manufactured in the same manner as in Example 1 except that the above pre-lithiation solution was used instead of the pre-lithiation solution used in Example 1.

Example 3: Manufacturing of Negative Electrode (1) Preparation of Pre-Lithiation Solution Hexane in which n-butyllithium (standard reduction potential: about −2.7 V vs. NHE) is dissolved at a concentration of 1.20 M was prepared as a pre-lithiation solution.

(2) Manufacturing of Negative Electrode

A negative electrode was manufactured in the same manner as in Example 1 except that the above pre-lithiation solution was used instead of the pre-lithiation solution used in Example 1.

Comparative Example 1: Manufacturing of Negative Electrode

A negative electrode was manufactured in the same manner as in Example 1 except that the preliminary negative electrode of Manufacturing Example 1 was used as a negative electrode of a secondary battery without being pre-lithiated.

Comparative Example 2: Manufacturing of Negative Electrode (1) Preparation of Negative Electrode Active Material (Pre-Lithiation)

A preliminary negative electrode active material was prepared by mixing artificial graphite and SiO in a weight ratio of 7:3. The preliminary negative electrode active material was introduced into the pre-lithiation solution prepared in Example 1 and left for 24 hours. Thereafter, the preliminary negative electrode active material was taken out, washed with hexane, and then dried to prepare a negative electrode active material.

(2) Manufacturing of Negative Electrode

The prepared negative electrode active material, denka black which is a conductive material, styrene butadiene rubber (SBR) and carboxymethylcellulose (CMC) which are binders were added to water in a weight ratio of 92:3:3.5:1.5 to prepare negative electrode slurry. The negative electrode slurry was applied to a copper (Cu) metal thin film having a thickness of about 20 μm, which is a negative electrode current collector, such that a loading amount reaches 5 mg/cm$^2$, dried for 12 hours in a vacuum oven at 130° C., and then roll pressed to manufacture a preliminary negative electrode.

Comparative Example 3: Manufacturing of Negative Electrode (1) Preparation of Pre-Lithiation Solution Hexane in which $Li_2CO_3$ (standard reduction potential: about 0.0 V (−2.0 V or higher) vs. NHE) is dissolved at a concentration of 0.1 M was prepared as a pre-lithiation solution.

(2) Manufacturing of Negative Electrode

A negative electrode was manufactured in the same manner as in Example 1 except that the above pre-lithiation solution was used instead of the pre-lithiation solution used in Example 1.

Experimental Example 1: Evaluation of Initial Efficiency

A coin half cell was manufactured using the negative electrode of each of Examples 1 to 3 and Comparative Examples 1 to 3 in the following manner, and the initial efficiency (initial reversibility) was evaluated.

The manufactured negative electrode was blanked into a circular shape of 1.4875 cm$^2$, and a porous polyolefin separator was interposed between a lithium metal thin film (having a circular shape of 1.7671 cm$^2$) which is an opposing electrode and the negative electrode. Thereafter, a mixed solvent in which ethylene carbonate (EC) and diethyl carbonate (DEC) are mixed in a mixing volume ratio of 5:5, and an electrolyte in which $LiPF_6$ is dissolved at a concentration of 1 M were introduced to manufacture a lithium coin half cell.

Thereafter, each of the coin half cells was charged by being applied to a current at a current density of 0.1C-rate to a voltage of 0.005 V (vs Li/Li+), and then discharged with the same current density to a voltage of 1.5 V. At this time, the discharge capacity with respect to the charge capacity of the battery was measured to calculate the initial efficiency (%), and the results are shown in Table 1.

including the negative electrode of Comparative Example 3, electromotive force for reducing the negative electrode was not sufficient, so that it can be seen that the pre-lithiation was not smoothly performed.

Comparative Example 4: Manufacturing of Secondary Battery (1) Preparation of Pre-Lithiation Solution Hexane in which n-butyllithium is dissolved at a concentration of 0.1 M was prepared as a pre-lithiation solution.

(2) Pre-Lithiation of Negative Electrode (Performed in Battery State)

The preliminary negative electrode of Manufacturing Example 1 and $LiCoO_2$ which is an opposing electrode were used, and a polyolefin separator was interposed therebetween. Thereafter, the pre-lithiation solution was injected thereto to manufacture a coin full cell for pre-lithiation. Thereafter, the manufactured coin full cell was applied with a current at a current density of 0.1 C-rate to perform pre-lithiation for 90 minutes.

(3) Completion of Battery.

Thereafter, the pre-lithiation solution was removed from the coin full cell, and hexane was injected for washing. Thereafter, a mixed solvent in which ethylene carbonate (EC) and diethyl carbonate (DEC) are mixed in a mixing volume ratio of 5:5, and an electrolyte in which $LiPF_6$ is dissolved at a concentration of 1 M were introduced thereto to complete the manufacturing of a coin full cell.

Experimental Example 2: Evaluation of Cycle Performance

The negative electrode of each of Examples 1 to 3 and Comparative Examples 1 to 3 was respectively used to manufacture coin full cells, and the coin full cells and the coin full cell of Comparative Example 4 were evaluated for cycle performance.

Specifically, each of the negative electrodes of Examples 1 to 3 and Comparative Examples 1 to 3 and $LiCoO_2$ which is an opposing electrode were used, and a polyolefin separator was interposed therebetween. Thereafter, a mixed solvent in which ethylene carbonate (EC) and diethyl carbonate (DEC) are mixed in a mixing volume ratio of 5:5, and an electrolyte in which $LiPF_6$ is dissolved at a concentration of 1 M were introduced to manufacture lithium coin full cells.

The manufactured coin full cells and the coin full cell of Comparative Example 4 were evaluated for cycle performance in the following manner. Specifically, each coin full cell was charged by being applied a current at a current density of 0.5 C-rate to a voltage of 4.2 V, and then discharged with the same current density to a voltage of 2.5

TABLE 1

| | Example 1 | Example 2 | Example 3 | Comparative Example 1 | Comparative Example 2 | Comparative Example 3 |
|---|---|---|---|---|---|---|
| Initial efficiency (%) | 92 | 87 | 84 | 80 | 83 | 80 |

Referring to Table 1, half cells including the negative electrode of each of Examples 1 to 3 which has been subjected to the pre-lithiation process according to the present invention have a higher initial efficiency than half cells including the negative electrode of each of Comparative Examples 1 to 3. Particularly, in the case of the half cell V. At this time, the discharge capacity after the first cycle and the discharge capacity of the 100$^{th}$ cycle were measured, and the capacity retention rate was calculated according to the following equation.

Capacity retention rate (%)=discharge capacity of 100th cycle/discharge capacity of first cycle

TABLE 2

|  | Example 1 | Example 2 | Example 3 | Comparative Example 1 | Comparative Example 2 | Comparative Example 3 | Comparative Example 4 |
|---|---|---|---|---|---|---|---|
| Capacity retention rate (%) | 88 | 85 | 75 | 71 | 75 | 71 | 77 |

Referring to Table 2, it can be seen that the coin full cells respectively including the negative electrode of each of Examples 1 to 2 which has been subjected to the pre-lithiation process according to the present invention have a higher capacity retention rate than the coin full cells respectively including the negative electrode of each of Comparative Examples 1 to 3 and Comparative Example 4. Particularly, it can be seen that the coin full cell of Comparative Example 4 has a low capacity retention rate because the positive electrode was also exposed to the pre-lithiation solution during the pre-lithiation which was performed using the pre-lithiation solution, so that the positive electrode was also reduced to cause a structural variation.

The invention claimed is:

1. A method for manufacturing a negative electrode, the method comprising:
   immersing a preliminary negative electrode in a pre-lithiation solution containing a lithium organic compound and a pre-lithiation solvent; and
   taking the preliminary negative electrode out of the pre-lithiation solution and then removing the pre-lithiation solvent present in the preliminary negative electrode,
   wherein the preliminary negative electrode includes a current collector and a preliminary negative electrode active material layer disposed on the current collector,
   wherein the preliminary negative electrode active material layer includes a negative electrode active material, and
   wherein the standard reduction potential of the lithium organic compound is lower than the standard reduction potential of the negative electrode active material,
   wherein removing the pre-lithiation solvent comprises washing and drying the preliminary negative electrode taken out of the pre-lithiation solution, and
   wherein the lithium organic compound comprises at least one selected from the group consisting of n-butyl lithium, lithium triethylborohydride, lithium aluminum hydride, lithium tetrahydridoaluminate, methyl lithium, sec-butyllithium, isopropyl lithium, tert-butyllithium, and phenyllithium, and
   wherein the lithium organic compound is included in the pre-lithiation solution at a concentration of 0.01 M to 0.1 M.

2. The method of claim 1, wherein the pre-lithiation solvent comprises at least one selected from the group consisting of hexane, diethyl ether, xylene, toluene, tetrahydrofuran, and dioxolane.

3. The method of claim 1, wherein the immersing is performed for about 5 hours to 48 hours.

4. The method of claim 1, wherein the negative electrode active material comprises at least one of $SiO_x$ ($0 \leq x < 2$) and a carbon-based material.

5. The method of claim 1, not comprising applying a current to the preliminary negative electrode.

* * * * *